United States Patent
Wang

(10) Patent No.: US 6,199,913 B1
(45) Date of Patent: Mar. 13, 2001

(54) FAST CONNECTOR FOR GARDENING HOSE

(76) Inventor: Hsin-Fa Wang, P.O. Box 453, Taichung (TW)

( * ) Notice: Subject to any disclaimer, the term of this patent is extended or adjusted under 35 U.S.C. 154(b) by 0 days.

(21) Appl. No.: 09/408,202

(22) Filed: Sep. 29, 1999

(51) Int. Cl.⁷ ..................................................... F16L 35/00
(52) U.S. Cl. ............................ 285/24; 285/315; 285/319; 285/423
(58) Field of Search .................................. 285/315, 316, 285/24, 27, 319, 423

(56) References Cited

U.S. PATENT DOCUMENTS

| 4,219,222 | * | 8/1980 | Brusadin ................................. 285/8 |
| 4,660,803 | * | 4/1987 | Johnston et al. ........................ 285/24 |
| 4,681,350 | * | 7/1987 | Gaita ..................................... 285/315 |
| 4,903,942 | * | 2/1990 | Licciardello .......................... 285/315 |

* cited by examiner

Primary Examiner—Dave W. Arola

(57) ABSTRACT

A fast hose connector comprises a guide tube and an arresting tube movably fitted over the guide tube. The arresting tube is provided in the inner wall thereof with two elastic retaining bodies capable of releasably arrest a tube that is inserted into the guide tube via the arresting tube. As the arresting tube is pressed to slide downward along the guide tube, the elastic retaining bodies become disengaged with the tube so as to enable the tube to be pulled out of the connector.

1 Claim, 7 Drawing Sheets

FAST CONNECTOR FOR GARDENING HOSE

FIELD OF THE INVENTION

The present invention relates generally to a gardening hose, and more particularly to a fast connector of the gardening hose.

BACKGROUND OF THE INVENTION

As shown in FIGS. 1 and 2, a fast hose connector of the prior art comprises an inner tube 10, which is provided in the outer wall thereof with a plurality of receiving holes 11 for receiving a retaining block 12. The upper half section of the inner tube 10 is fitted into a coil spring 13 whose bottom end is stopped by a stop ring 14 of the inner tube 10. The fast hose connector further comprises an outer tube 15 which is fitted over the upper half section of the inner tube 10 such that the bottom of a protruded ring 16 of the inner wall of the outer tube 15 is urged by the top end of the coil spring 13, and that the slanted retainers 17 of the top end of the outer tube 15 are retained by the bottom edge of the retaining ring 18 of the outer wall of the top end of the inner tube 10. The protruded ring 16 of the outer tube 15 is provided with a plurality of protruded strips 19 in contact with the retaining blocks 12 so as to enable the inner ends of the retaining blocks 12 to enter the inner wall of the inner tube 10. Now referring to FIG. 2, when an insertion tube 1 is inserted into the interior of the inner tube 10 via the outer tube 15, the inner ends of the retaining blocks 12 are retained in a recessed wall 2 of the insertion tube 1, so as to locate securely the insertion tube 1. As the outer tube 15 is pressed to displace to arrive at a locating ring 20 of the lower section of the inner tube 10, the protruded strips 19 of the protruded ring 16 of the outer tube 15 become separated from the retaining blocks 12, thereby enabling the insertion tube 1 is pulled upward so as to force the retaining blocks 12 to retract toward the inner wall of the outer tube 15. As a result, the insertion tube 1 can be pulled out of the inner tube 10 via the outer tube 15.

Such a prior art hose connector as described above is complicated in construction such that it is formed of many component parts, such as the inner tube 10, a plurality of retaining blocks 12, the coil spring 13, and the outer tube 15. In addition, the retaining blocks 12 must be aligned with the receiving holes 11 of the inner tube 10 at the time when the prior art hose connector is assembled. The work of alignment of the retaining blocks 12 with the receiving holes 11 is time-consuming.

SUMMARY OF THE INVENTION

The primary objective of the present invention is to provide a fast hose connector which is relatively simple in construction and costeffective.

In keeping with the principle of the present invention, the foregoing objective of the present invention is attained by a fast hose connector comprising a guide tube and an arresting tube. The guide tube is provided in the outer wall thereof with an upper guide ring, a lower guide ring, a stop ring, two longitudinal guide slots extending from the upper guide ring to the stop ring, and two through holes located under the upper guide ring such that the two through holes are in communication with the interior of the guide tube. Each through hole is provided in the top edge thereof and the bottom edge thereof with a slanted surface which is located in the outer wall of the guide tube and is provided with a pointed edge. The upper guide ring and the lower guide ring are provided with two protrusions opposite in location to each other. The arresting tube is provided in the inner wall thereof with two elastic retaining bodies opposite in location to each other and extending upward from the bottom of the inner wall of the arresting tube. The two elastic retaining bodies are provided at the top end thereof with an enlarged body having a recess located in the top thereof, and a slanted stop surface located in the bottom thereof. The arresting tube is further provided in the inner wall thereof with two longitudinal locating slots opposite in location to each other for locating the protrusions of the guide tube at the time when the arresting tube is fitted over the guide tube. In the meantime, the two elastic retaining bodies of the arresting tube are guided along the guide slots of the guide tube such that the enlarged body of the elastic retaining bodies is received in the through hole of the guide tube, and that the recess of the enlarged body retains the pointed edge of the slanted surface of the through hole of the guide tube, and further that the enlarged body is extended into the inner wall of the guide tube.

DETAILED DESCRIPTION OF THE INVENTION

Figure 1:
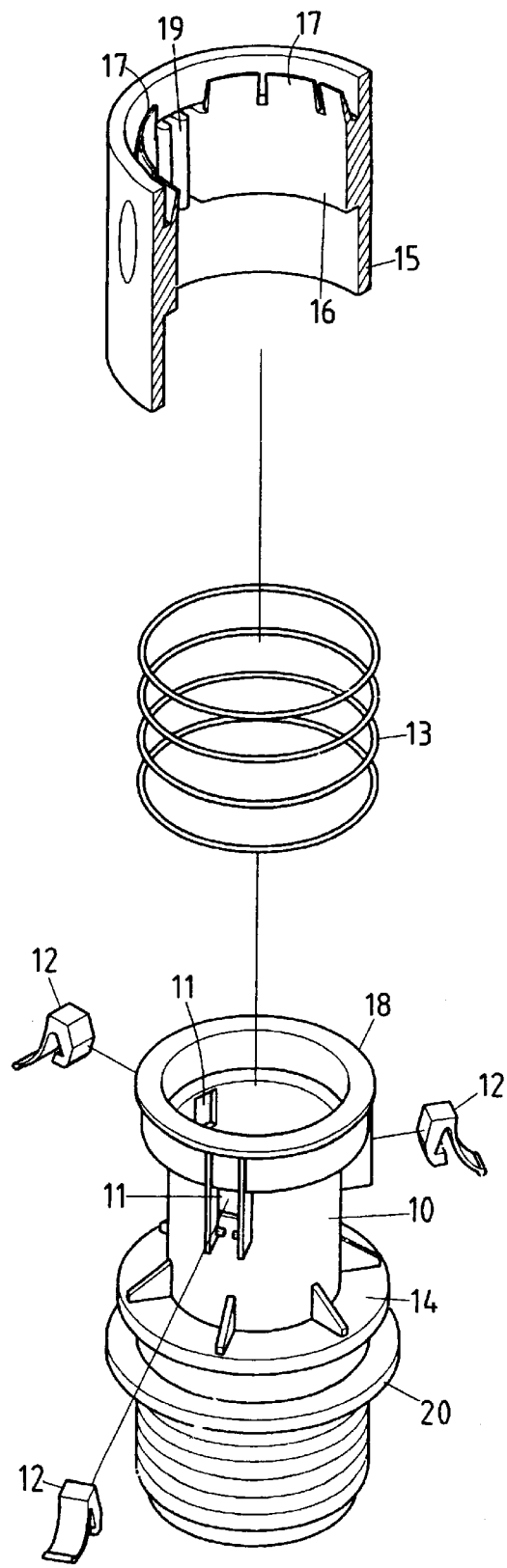
FIG. 1 shows an exploded view of a fast hose connector of the prior art.
Figure 2:
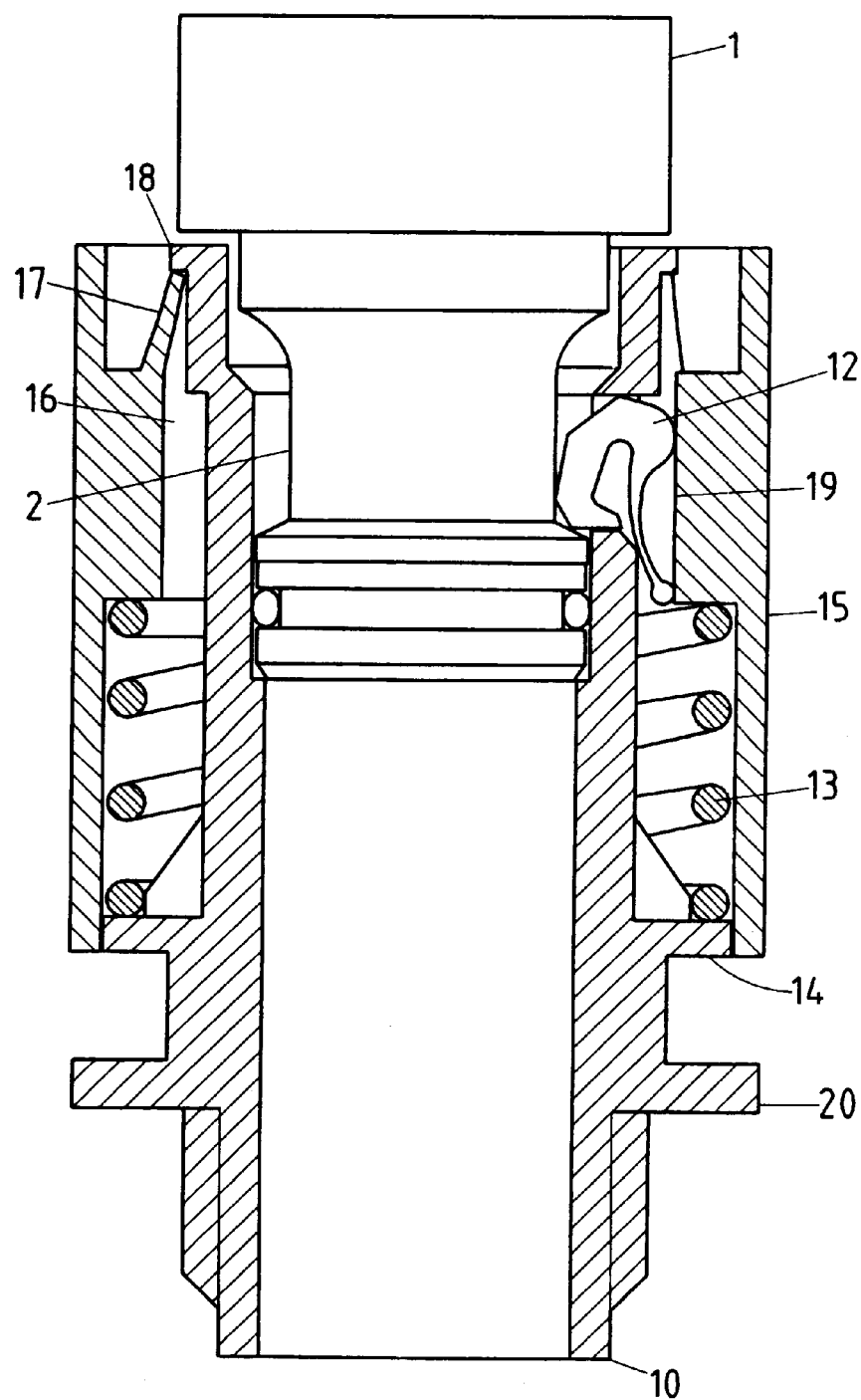
FIG. 2 shows a longitudinal sectional view of the prior art hose connector in combination and in engagement with an insertion tube.
Figure 3:
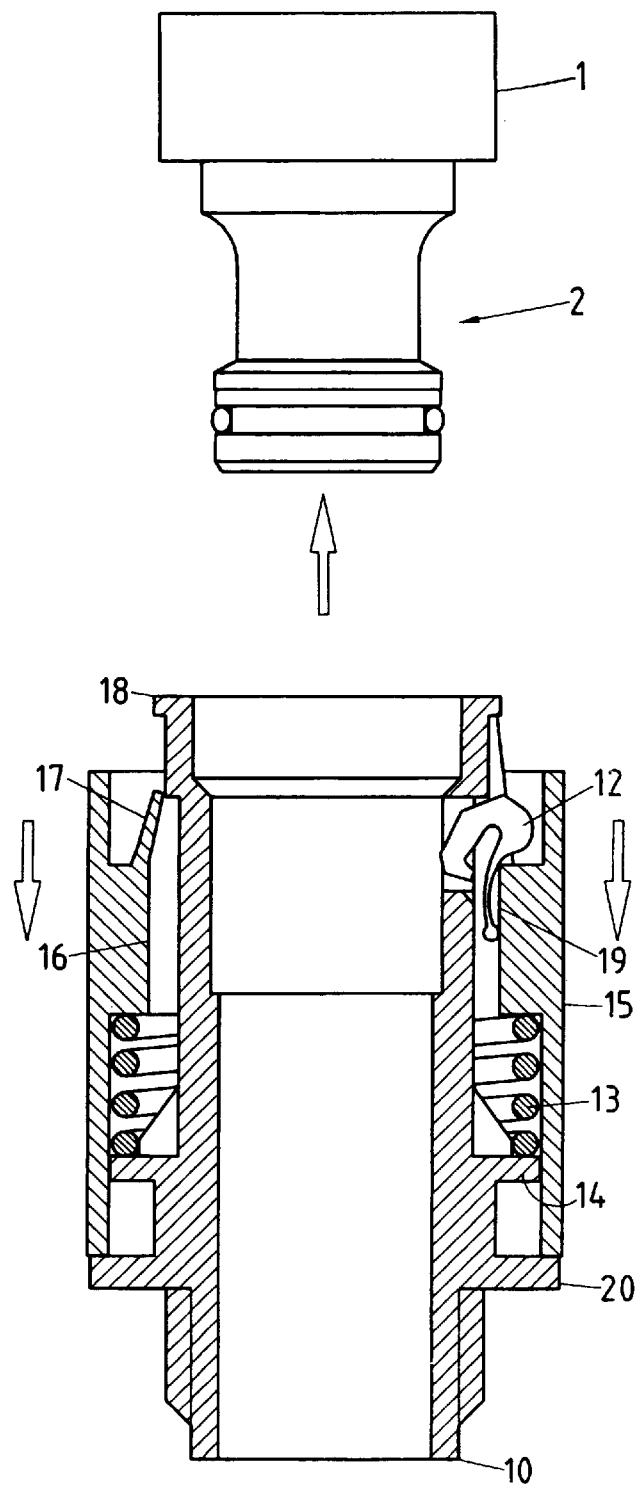
FIG. 3 shows a longitudinal sectional view of the prior art hose connector in disengagement with the insertion tube.
Figure 4:
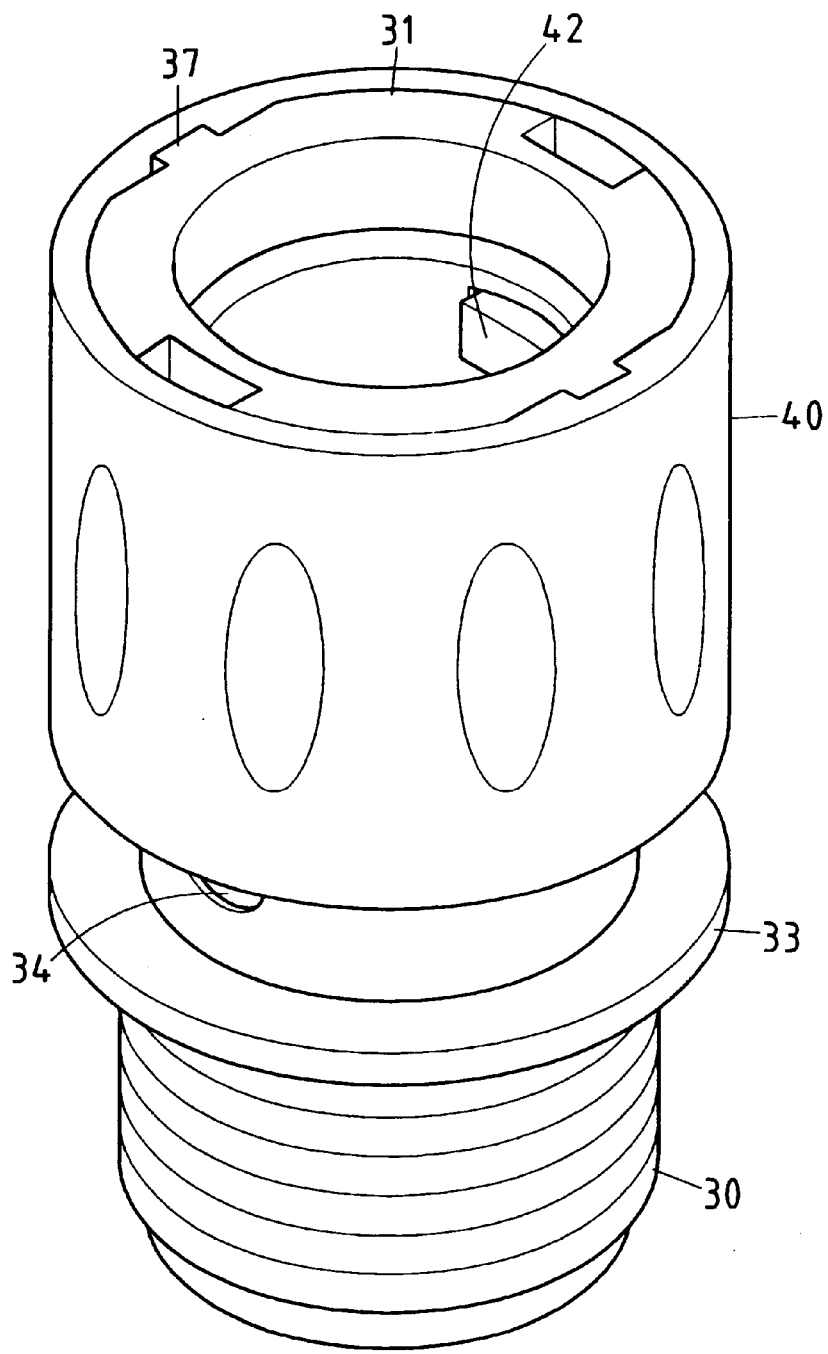
FIG. 4 shows a perspective view of a fast hose connector of the present invention.
Figure 5:
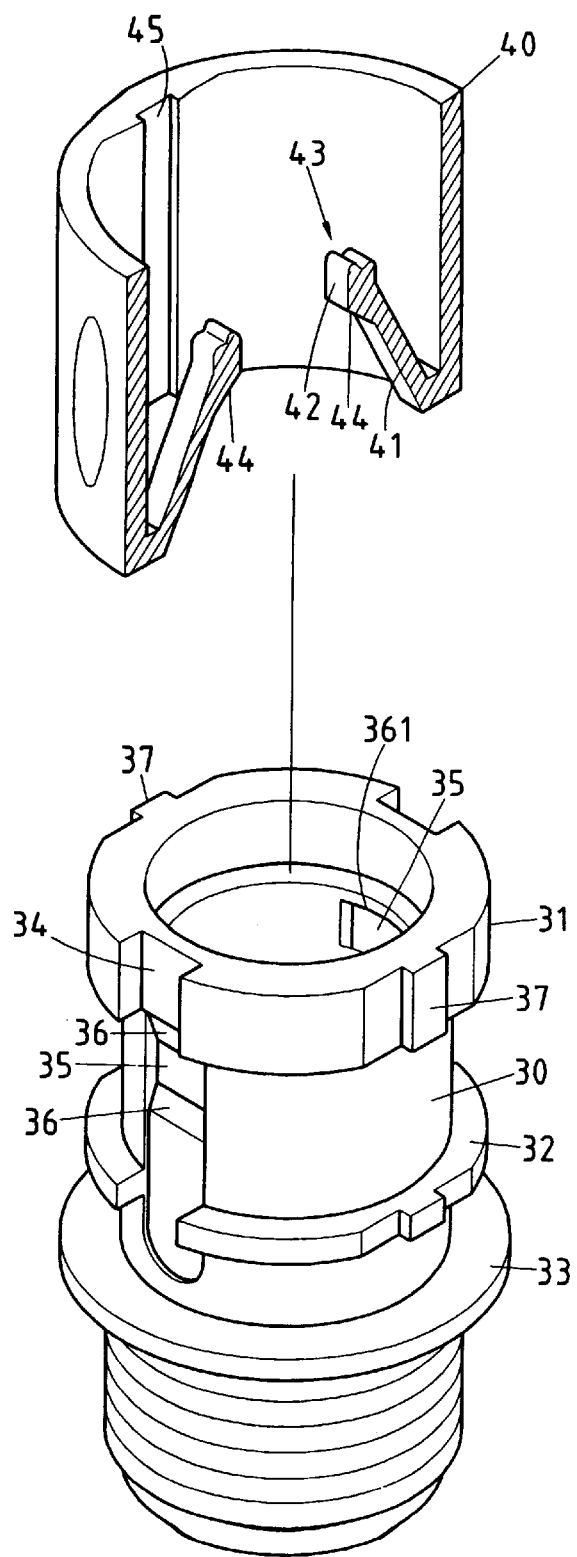
FIG. 5 shows an exploded view of the fast hose connector of present invention.

As shown in FIGS. 4–7, a fast connector embodied in the present invention is designed for use in connecting a gardening hose and is composed of a guide tube 30 and an arresting tube 40.

The guide tube 30 is provided in the outer wall thereof with an upper guide ring 31, a lower guide ring 32, a stop ring 33, two longitudinal guide slots 34 extending from the upper guide ring 31 to the stop ring 33, and two through holes 35 located under the upper guide ring 31 such that the two through holes 35 are in communication with the interior of the guide tube 30. Each through hole 35 is provided in the top edge thereof and the bottom edge thereof with a slanted surface 36 which is located in the outer wall of the guide tube 30 and is provided with a pointed edge 361. The upper guide ring 31 and the lower guide ring 32 are provided with two protrusions 37 opposite in location to each other.

The arresting tube 40 is provided in the inner wall thereof with two elastic retaining bodies 41 opposite in location to each other and extending upward from the bottom edge of the inner wall of the arresting tube 40. The two elastic retaining bodies 41 are provided at the top end thereof with an enlarged portion 42 having a retaining recess 43 located in the top thereof and a slanted stop surface 44 located in the bottom thereof. The arresting tube 40 is further provided in the inner wall thereof with two longitudinal locating slots 45 opposite in location to each other for locating the protrusions 37 of the guide tube 30 at the time when the arresting tube 40 is fitted over the guide tube 30. In the meantime, the two elastic retaining bodies 41 of the arresting tube 40 are guided along the guide slots 34 of the guide tube 30 such that the enlarged portion 42 of the elastic retaining bodies 41 is received in the through hole 35 of the guide tube 30, and that the retaining recess 43 of the enlarged portion 42 retains the pointed edge 361 of the slanted surface 36 of the through holes 36 of the guide tube 30, and further that the enlarged portion 42 is extended into the inner wall of the guide tube 30.

Figure 6:
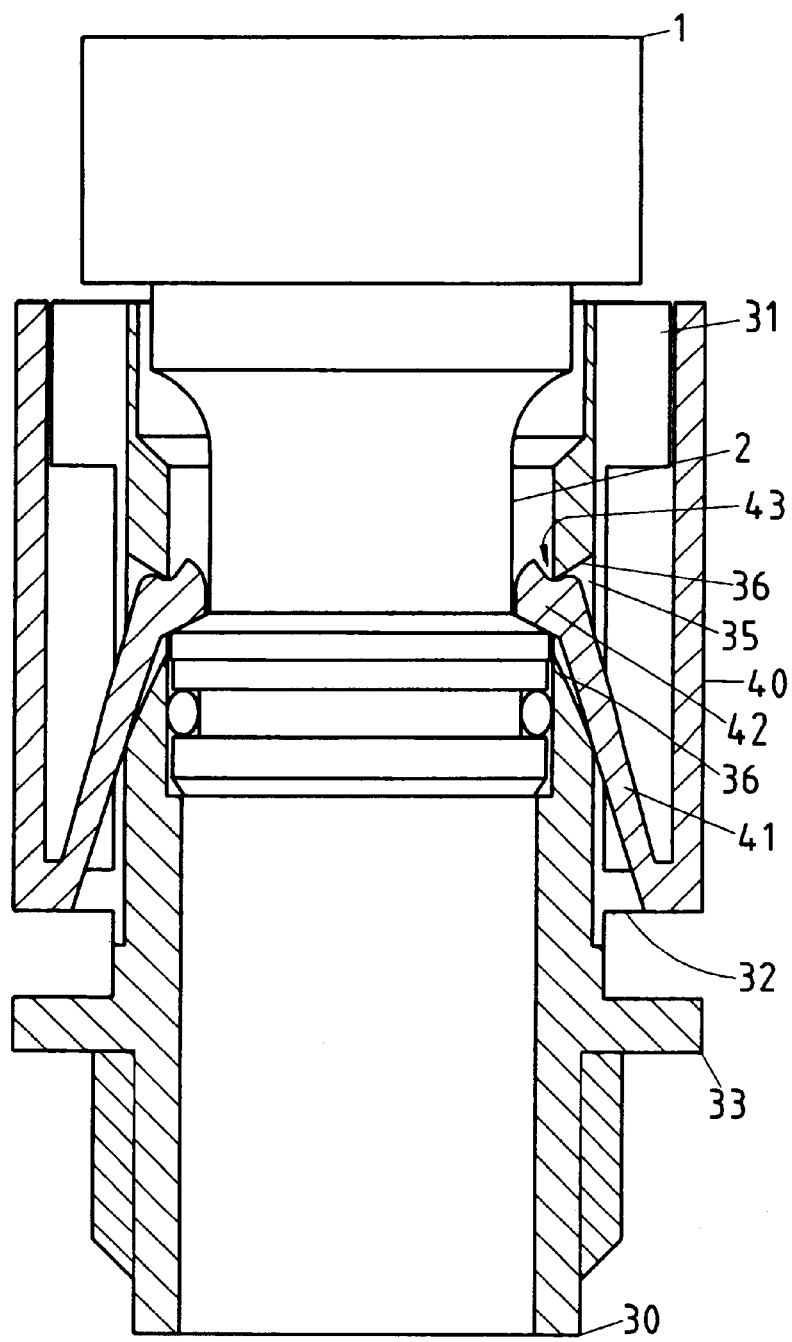
FIG. 6 shows a longitudinal sectional view of the present invention in engagement with an insertion tube.
Figure 7:
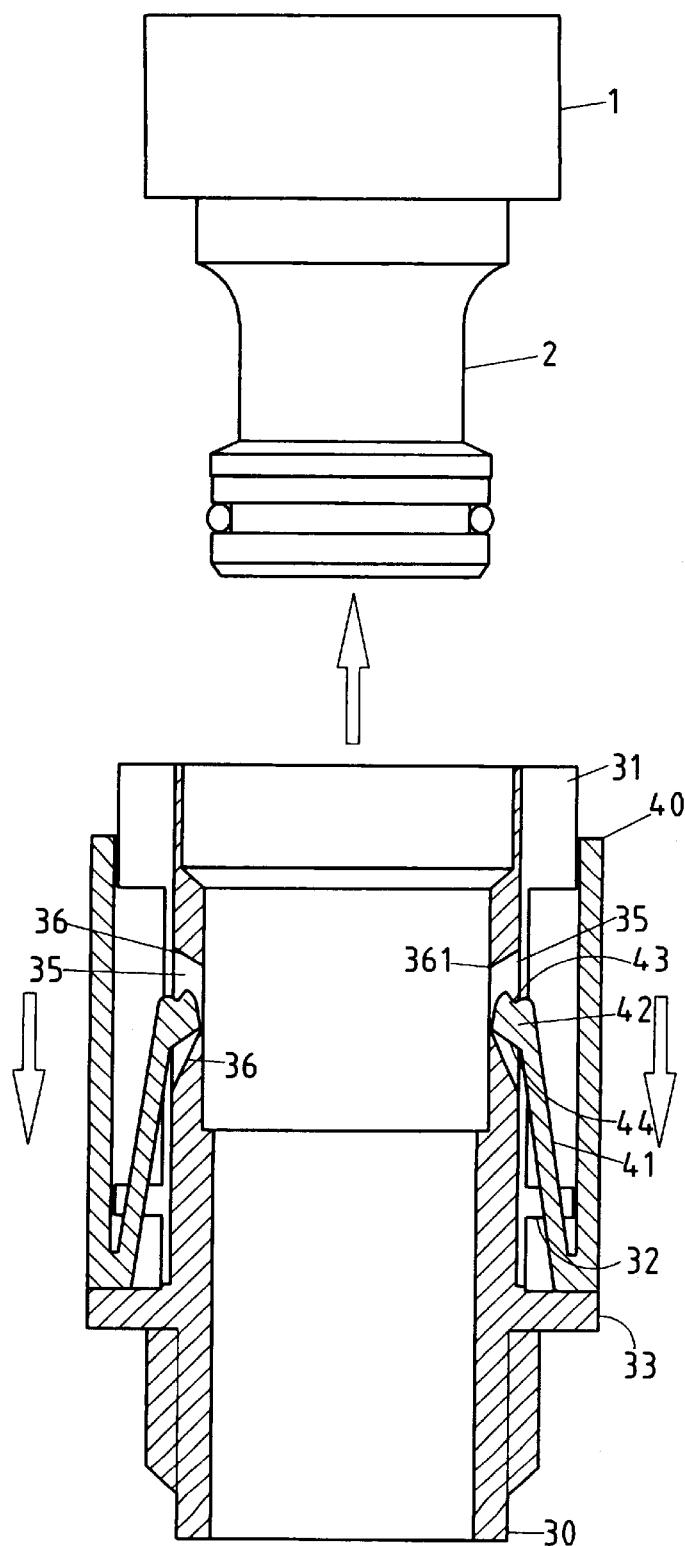
FIG. 7 shows a longitudinal sectional view of the present invention in disengagement with the insertion tube.

As shown in FIGS. 6 and 7, an insertion tube 1 is inserted into the guide tube 30 via the arresting tube 40. The insertion tube 1 has a recessed wall 2, in which the enlarged portions 42 of the two elastic retaining bodies 41 of the arresting tube 40 are retained, so as to locate the insertion tube 1. As the arresting tube 40 is pressed such that the arresting tube 40 slides downward until the arresting tube 40 is stopped by the stop ring 33 of the guide tube 30. In the meantime, the two elastic retaining bodies 41 slide along the slanted surfaces 36 to cause the enlarged portions 42 to move away from the recessed wall 2 of the insertion tube 1, thereby enabling the insertion tube 1 to be pulled out of the connector of the present invention. As the arresting tube 40 is let go, the two elastic retaining bodies 41 move back up to their original positions by virtue of their own elasticity. As a result, the recess 43 of the enlarged portion 42 of the elastic retaining bodies 41 is stopped by the pointed edge 361 of the slanted surface 36 of the through hole 35. In other words, the arresting tube 40 automatically returns to its position.

What is claimed is:

1. A fast hose connector comprising:

a guide tube provided in an outer wall thereof with an upper guide ring, a lower guide ring, a stop ring, two longitudinal guide slots extending from said upper guide ring to said stop ring, and two through holes located under said upper guide ring in said guide slots in such a manner that said two through holes are in communication with an interior of said guide tube, with each of said two through holes being provided in a top edge thereof and a bottom edge thereof with a slanted surface which is located in the outer wall of said guide tube and is provided with a pointed edge, said upper guide ring and said lower guide ring further provided with two protrusions opposite in location to each other; and an arresting tube provided in an inner wall thereof with two elastic retaining bodies opposite in location to each other and extending from a bottom edge of the inner wall of said arresting tube, said two elastic retaining bodies being provided at a top end thereof with an enlarged portion having a retaining recess and a slanted stop surface, said arresting tube further provided in the inner wall thereof with two longitudinal locating slots opposite in location to each other whereby said arresting tube is movably fitted over said guide tube such that at least said enlarged portions of said elastic retaining bodies are received in said guide slots and said protrusions of said guide tube are located in said locating slots of said arresting tube, and that said enlarged portion of said elastic retaining bodies of as said arresting tube is movably fitted over said guide tube said arresting tube is received in said through hole of said guide tube, and further that said retaining recess of said enlarged portion of said elastic retaining bodies of said arresting tube retains said pointed edge of said slanted surface of said through holes of said guide tube, and further that said enlarged portions of said arresting tube are extended into said guide tube;

said enlarged portions of said elastic retaining bodies of said arresting tube being intended to arrest releasably a tube inserted into said guide tube via said arresting tube such that said enlarged portions of said elastic retaining bodies are retained in a recessed wall of the tube so as to locate the tube, and that said elastic retaining bodies slide along said slanted surfaces of said guide tube to cause said enlarged portions to move away from the recessed wall of the tube so as to enable the tube to be pulled out of said guide tube and said arresting tube at such time when said arresting tube is pressed by an external force to slide until said arresting tube is stopped by said stop ring of said guide tube, and further that said two elastic retaining bodies return to original positions thereof by virtue of elasticity thereof at such time when said arresting tube is relieved of the external force exerting thereon.

* * * * *